US008033910B2

(12) United States Patent
Davis

(10) Patent No.: US 8,033,910 B2
(45) Date of Patent: Oct. 11, 2011

(54) GAMING METHOD AND MACHINE WITH BONUS ROUND

(75) Inventor: Wesley Steven Davis, Notre Dame (CA)

(73) Assignee: Spielo Manufacturing ULC, Moncton, New Brunswick (CA)

(*) Notice: Subject to any disclaimer, the term of this patent is extended or adjusted under 35 U.S.C. 154(b) by 1057 days.

(21) Appl. No.: 10/930,701

(22) Filed: Aug. 30, 2004

(65) Prior Publication Data

US 2005/0064933 A1 Mar. 24, 2005

Related U.S. Application Data

(60) Provisional application No. 60/498,577, filed on Aug. 29, 2003.

(51) Int. Cl.
*A63F 13/00* (2006.01)

(52) U.S. Cl. ............................... 463/25; 463/16; 463/20

(58) Field of Classification Search ............. 463/16–22, 463/25; 273/143 R
See application file for complete search history.

(56) References Cited

U.S. PATENT DOCUMENTS

| | | | | |
|---|---|---|---|---|
| 6,159,097 | A * | 12/2000 | Gura | 463/20 |
| 6,450,883 | B1 * | 9/2002 | O'Halloran | 463/16 |
| 6,599,192 | B1 * | 7/2003 | Baerlocher et al. | 463/25 |
| 6,733,386 | B2 * | 5/2004 | Cuddy et al. | 463/17 |
| 6,776,711 | B1 * | 8/2004 | Baerlocher | 463/16 |
| 6,974,385 | B2 * | 12/2005 | Joshi et al. | 463/20 |
| 2004/0048644 | A1 * | 3/2004 | Gerrard et al. | 463/16 |
| 2004/0053680 | A1 * | 3/2004 | Schultz | 463/20 |
| 2005/0003880 | A1 * | 1/2005 | Englman et al. | 463/16 |
| 2006/0160596 | A1 * | 7/2006 | Sato et al. | 463/16 |
| 2006/0223611 | A1 * | 10/2006 | Baerlocher et al. | 463/16 |

* cited by examiner

*Primary Examiner* — Masud Ahmed
(74) *Attorney, Agent, or Firm* — Sullivan & Worcester LLP; Christopher T. McWhinney

(57) ABSTRACT

The present invention provides a gaming method and machine with bonus round that allow a player select the risk level of the bonus play. Thus the player has control over risk during their bonus round. As the player becomes more familiar with the game, they can select a higher risk for the bonus round and be rewarded accordingly. The bonus may include a fixed or variable number of additional turns. The gaming method and machine may include a progressive counter incremented in dependence upon at least one of regular play and bonus play. The gaming method and machine may allow a player to win an additional bonus play during the bonus play.

43 Claims, 8 Drawing Sheets

GAMING METHOD AND MACHINE WITH BONUS ROUND

RELATED APPLICATION

The present application is related to and claims priority of U.S. Provisional Application No. 60/498,577 filed Aug. 29, 2003, the disclosure of which is herein specifically incorporated in its entirety by this reference.

FIELD OF THE INVENTION

The present invention relates to gaming methods and machines and is particularly concerned with bonus rounds.

BACKGROUND OF THE INVENTION

Video gaming machines are commonly used in traditional gambling establishments such as casinos and gambling centers and in other markets such as bars, restaurants, racinos, bingo halls, river boats, and cruise ships. While the regulations covering these different establishments are different, they also vary from one jurisdiction to another and the habits of players may also vary. Hence, a game that can attract and maintain the interest of a player provides higher value to the proprietor. Consequently, there is a need to continually improve game features, while maintaining a fairly high level of familiarity so that established players can also enjoy the new game features.

Because the number of games allowed within an establishment are typically regulated and because the gaming machines have a relatively short payback cycle, the gaming machine business is highly competitive. Hence there is further pressure on the industry to make improvements in game features that enhance their play value.

Gaming machines provide games that fall into general categories that emulate traditional games of chance such as keno, bingo, scratch tickets, fixed-odds betting, other types of wager games, slot-machine emulation and card game emulation. These typically reward a player having a predetermined outcome with a bonus round of play or other incentives. While numerous variations of bonus round, the bonus round still offers opportunities for further innovation that may provide an advantage with regard to playability, player loyalty or profitability.

SUMMARY OF THE INVENTION

An object of the present invention is to provide improved gaming method and machine with bonus round.

In accordance with an aspect of the present invention there is provided a gaming method with bonus round comprising the steps of during a regular play session, providing a bonus trigger; on hitting the bonus trigger during a regular play session rewarding a bonus play; allowing a player to select a risk level for the bonus play; and providing the bonus play with the selected risk level. In one alternative embodiment, the bonus play may include a plurality of additional spins.

In accordance with an aspect of the present invention there is provided a computer-readable storage medium encoded with a program for enabling a gaming machine to implement the gaming method comprising the steps of during a regular play session, providing a bonus trigger; on hitting the bonus trigger during a regular play session rewarding a bonus play; allowing a player to select a risk level for the bonus play; and providing the bonus play with the selected risk level. In one alternative embodiment, the bonus play may include a plurality of additional spins.

In accordance with another aspect of the present invention there is provided a gaming machine with bonus round comprising: a bonus trigger for triggering a bonus during a regular play session; means for rewarding a bonus play on hitting the bonus trigger during a regular play session; means for allowing a player to select a risk level for the bonus play; and means for providing the bonus play with the selected risk level.

Conveniently, the gaming machine includes a progressive counter for incrementing in dependence upon at least one of regular play and bonus play.

Conveniently, the gaming machine includes a module for allowing a player to win an additional bonus during the bonus play.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
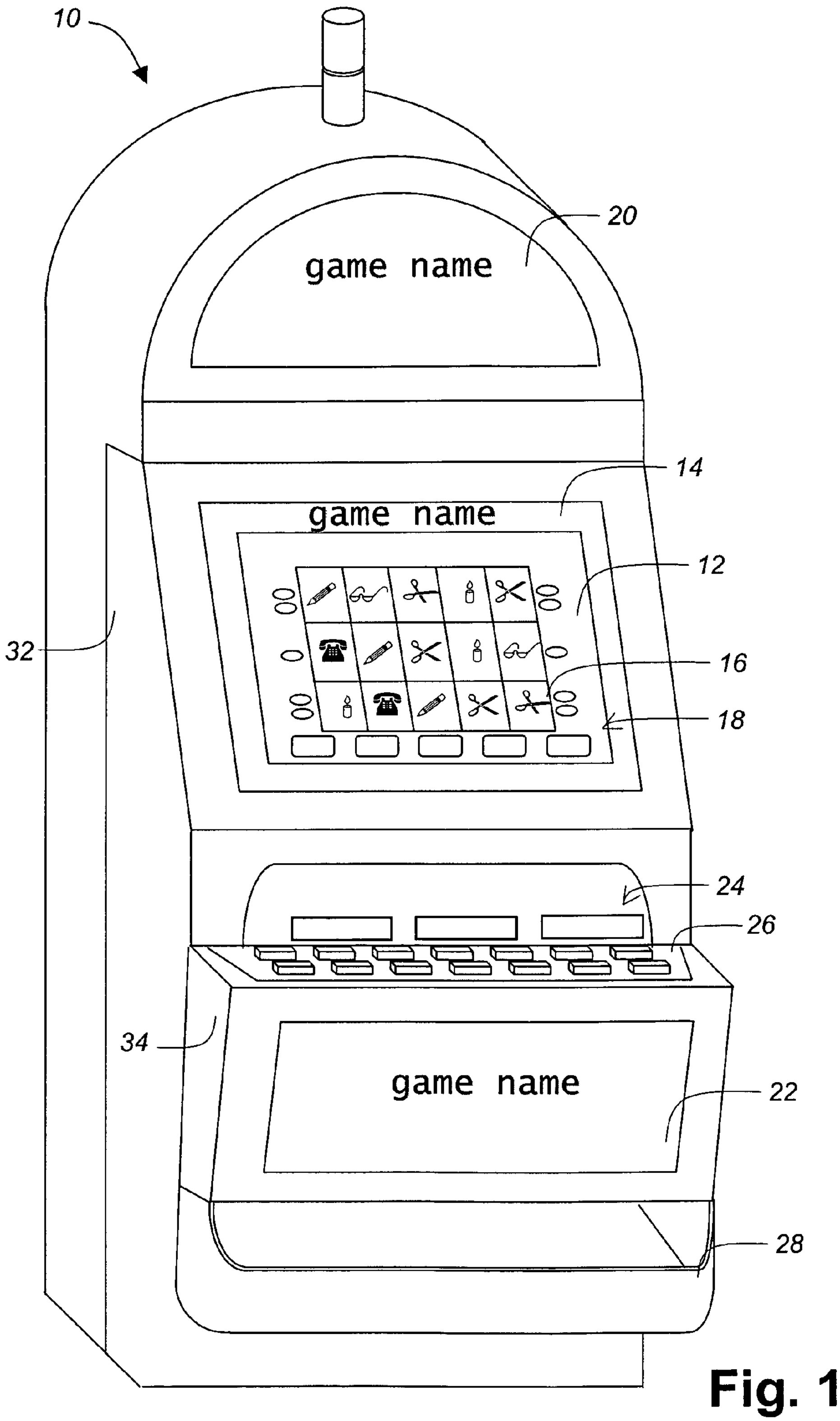
FIG. 1 illustrates gaming machine with bonus round in accordance with an embodiment of the present invention.

Referring to FIG. 1, there is illustrated in a isometric view a gaming machine programmable to implement the present invention. The gaming machine 10 includes a touch screen 12 that incorporates a game banner 14, a game screen 16 and soft keys 18. The gaming machine 10 also typically includes game posters 20 and 22, payment input and output devices 24, a keyboard 26 and a cash tray 28 all housed in a cabinet 30. The cabinet 30 includes a hinged front panel 32 and a hinged access door 34.

Figure 2:
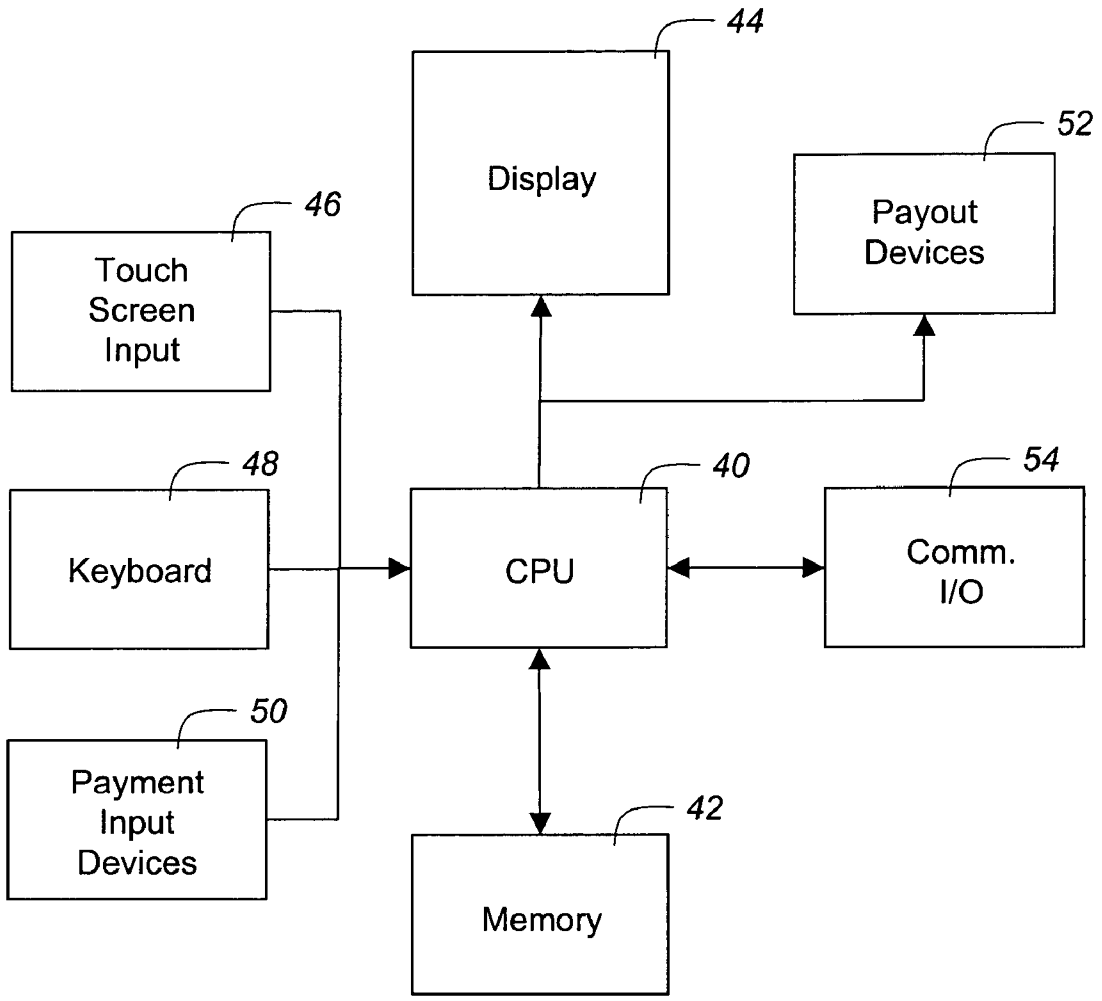
FIG. 2 illustrates in a block diagram, a computer system of the gaming machine of FIG. 1.

Referring to FIG. 2, there is illustrated in a block diagram a computer system of the gaming machine of FIG. 1. The computer system includes a central processing unit (CPU) 40, a memory 42 and a display 44. The computer system also includes a touch screen input 46, a keyboard 48, payment input devices 50, payment output devices 52 and a communications interface 54.

In operation, the gaming machine 10 under the control of a gaming program operating the CPU 40 provides, in the game screen 16 of the display 44, a representation of an m reel by n row slot machine emulation. A player on pressing a soft key 18 marked “Play” causes the gaming machine 10 to display a spin of the reels until a display of m×n game elements are shown in the display area. Typically a number of pay lines are provided for the player to pre-select prior to pressing the play button. Then, depending upon the particular game programmed into the CPU 40, when a predetermined outcome occurs along one of the selected pay lines, the player is rewarded with an increment to a credits counter.

As such gaming machines are a familiar sight in various establishments, the gaming industry has continuously sought ways to improve the game features to enhance qualities such as player loyalty, playability and hence profitability of the gaming machines. One such improvement over the slot machine, is the ability of the display-based gaming machine 10 to provide an additional round of play, in the form of a bonus round. Typically, the bonus round is a automatic spin that provides the player with an opportunity to win additional credits, beyond those won during regular play.

Figure 3:
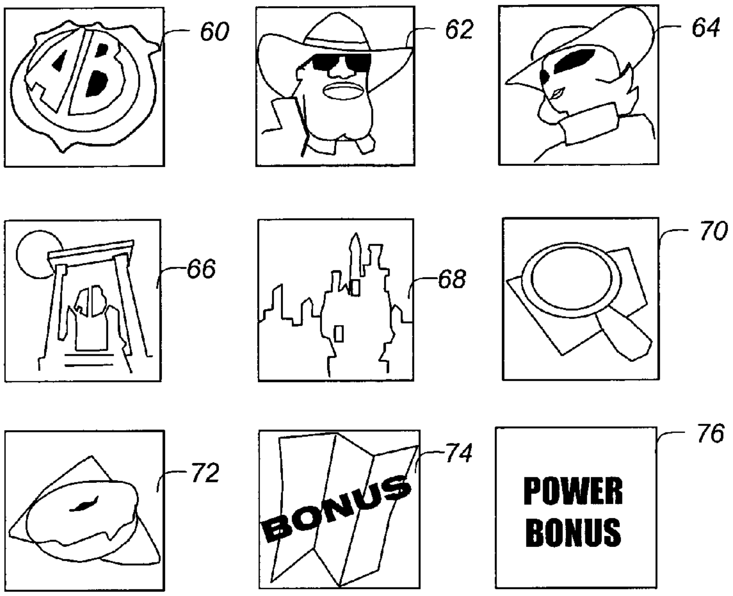
FIG. 3 illustrates game elements of a game for a gaming machine in accordance with an embodiment of the present invention.
Figure 4:
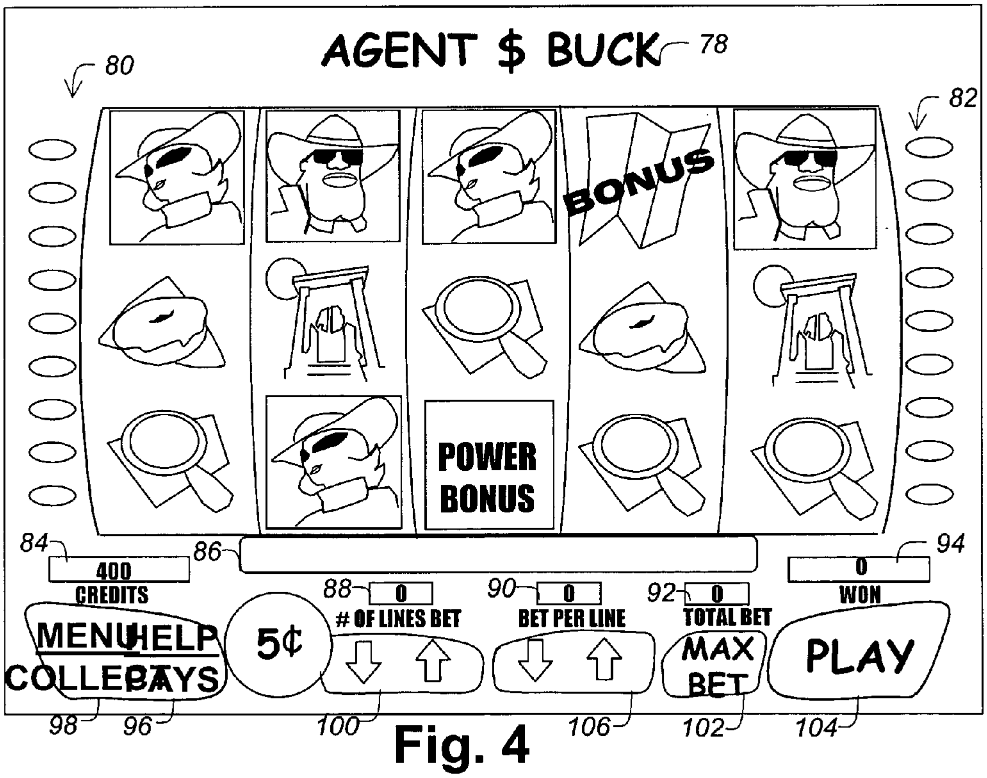
FIG. 4 illustrates a sample game screen of a game for a gaming machine in accordance with the embodiment of the present invention.

Referring to FIGS. 3 and 4 there are pictorially illustrated game elements and the game screen for a gaming machine game in accordance with a first embodiment of the present invention. The first embodiment is a five reel and nine payline game. Line pays are awarded when three, four or five identical elements appear on either the left or right side of the payline. The identical elements must appear on adjacent reels.

There are six regular elements that appear on all five reels as shown in FIGS. 3 and 4. They are as follows:

Agent Buck badge 60—jackpot element.
Agent Buck 62—2nd from top line pay element
Villain 64—3rd from top line pay element
Agent Buck’s building 66—4th from lowest line pay element
Villain’s castle 68—3rd from lowest line pay element.
magnifier glass 70—2nd from lowest line pay element.
donut 72—lowest line pay element.
mission bonus 74—does not form line wins, used strictly as a trigger element for the second screen mission bonus
power bonus 76—does not form line wins, used strictly as a trigger element for the second screen power bonus.

The main game screen 16 includes the following:

Agent Buck logo 78
bet tags 80 and 82
credits window 84
lower prompt window 86
# of lines window 88
bet per lines window 90
total bet window 92
won window 94
help/pays button 96
menu/collect button 98
# of lines buttons (up/down) 100
max bet button 102
play/stop button 104
bet per lines buttons (up/down) 106

Figure 5:
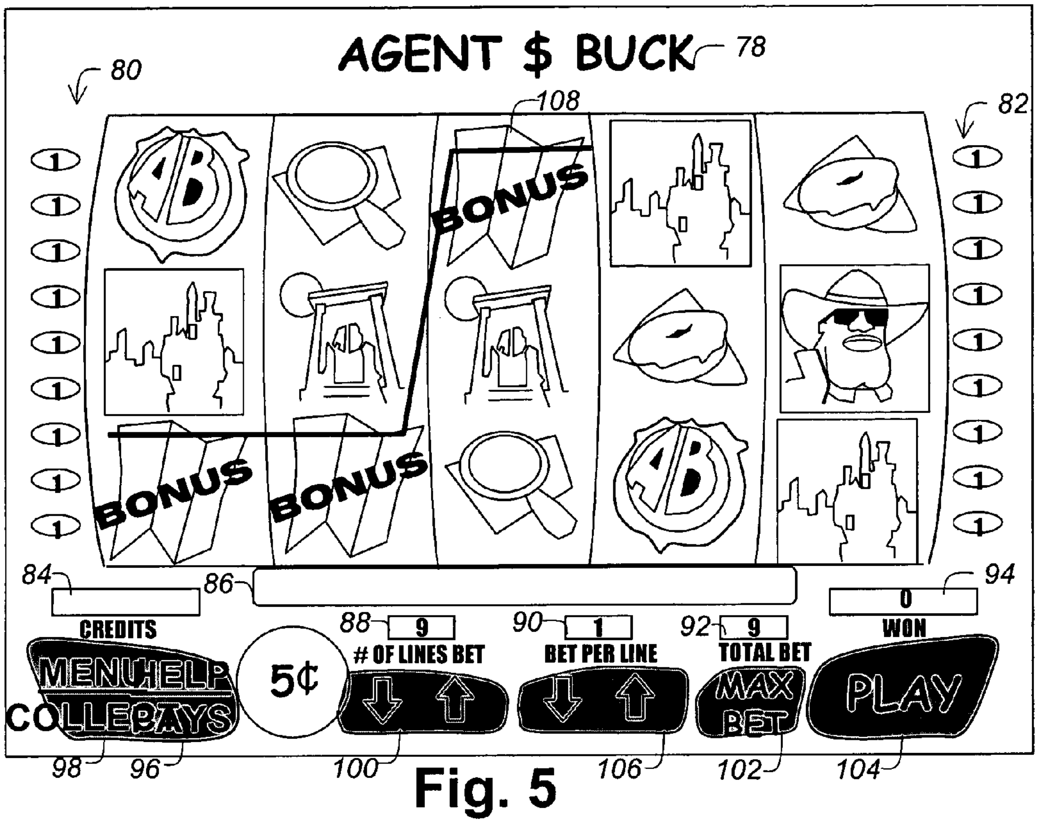
FIG. 5 illustrates on a sample game screen for the gaming machine game of FIGS. 3 and 4, how map elements acts trigger a mission bonus round.

Referring to FIG. 5 there is illustrated on a sample game screen for the gaming machine game of FIGS. 3 and 4, how map elements acts trigger a mission bonus round. The Mission Bonus Trigger occurs whenever map elements 74 appear on reels one, two and three as shown in FIG. 5 as emphasized by a line 108, which does not appear on the actual game screen.

Figure 6:
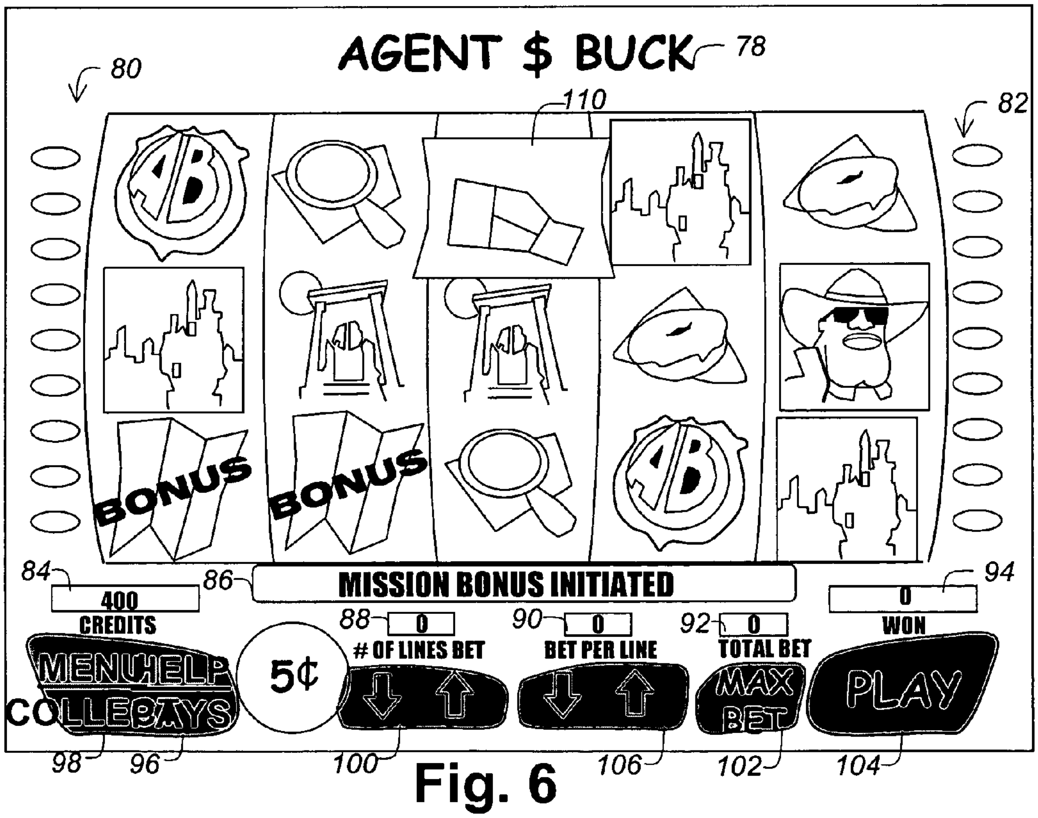
FIG. 6 illustrates on the sample game screen of FIG. 5 as the map element of reel three begins to zoom out to fill the screen.

Referring to FIG. 6 there is illustrated on the sample game screen of FIG. 5 as the map element of reel three begins to zoom out to fill the screen. Then a message “MISSION BONUS INITIATED” is displayed in the lower prompt window 86 as shown in FIG. 6. Also, the map element 74 on the center reel zooms108 almost filling the screen and the background changes to a darkened image of the main game screen.

Figure 7:
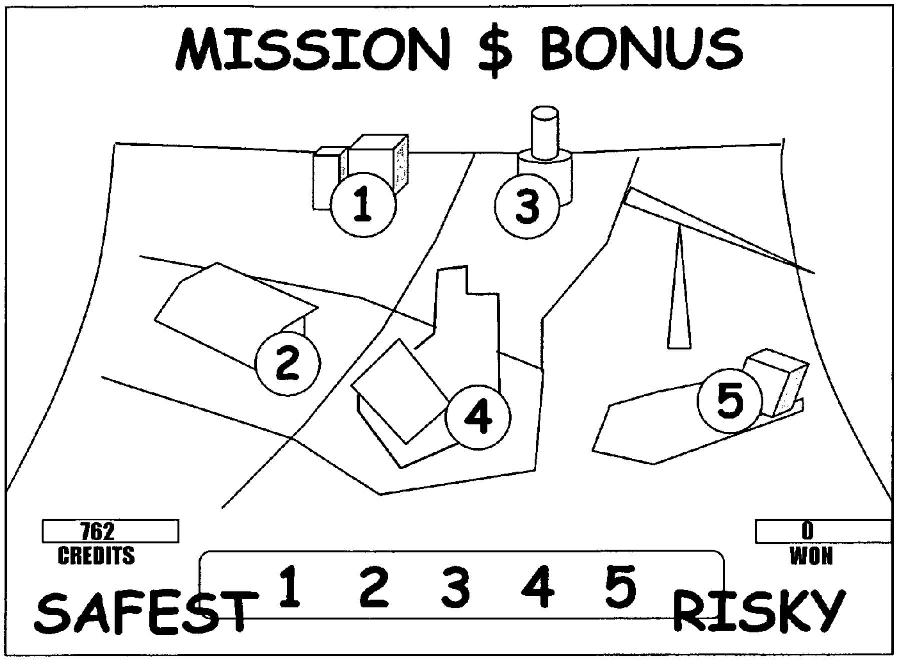
FIG. 7 illustrates a sample mission bonus round screen used to allow the player to select a risk level for the mission bonus round.

Referring to FIG. 7 there is illustrated a sample mission bonus round screen used to allow the player to select a risk level for the mission bonus round. All Line wins are awarded first, then the player is taken to a mission select screen as shown in FIG. 7 via the following sequence. Once the map has zoomed and the background changed, five mission areas pop up onto the screen one at a time. Then the numbers one to five pop up in order on top of the mission areas, with the finished screen appearing as shown in FIG. 7.

Figure 8:
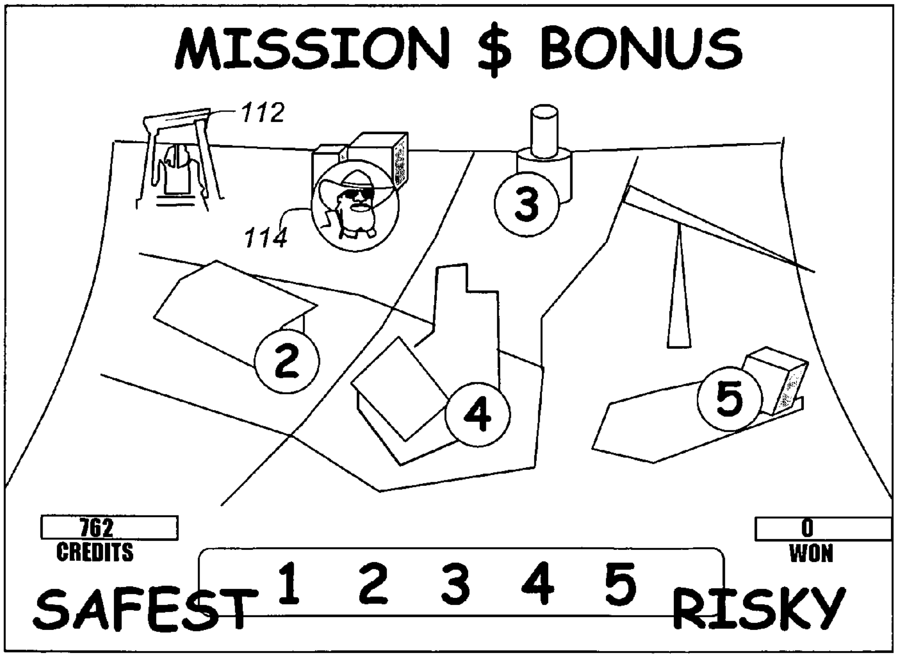
FIG. 8 illustrates on the sample mission bonus screen of FIG. 7 after the player has made a selection.

Referring to FIG. 8 there is illustrated on the sample mission bonus screen of FIG. 7 after the player has made a selection. Once the player selects one of the missions an image of Buck’s hideout appears and his head comes out of it and travels along the road to the selected location, with the resulting screen as shown in FIG. 8. Then the image for the selected area plays through its animation sequence. Once Buck reaches his destination we will start the bonus round transition sequence. There is a 25% Chance that Agent Buck stops for donuts at a donut shop that appears in the bottom left corner of the map. Once Buck has arrived at his destination, a black foreground is drawn with a transparent aperture, which slowly gets smaller around the selected mission area, until the entire screen is black. Once the screen is totally black, the background changes to the bonus screen background that corresponds to the selected mission area and the size of the transparent aperture increase, until the entire bonus screen is visible.

There are five separate missions to choose from each with ten question marks and their own unique background. Some of these question marks have hidden bet multipliers and some have bombs. The sequence leading into the bonus round is the same for each area. Mission one has one bomb, mission two has two bombs, mission three has three bombs, mission four has four bombs, and mission five has five bombs. The hidden bet multipliers and maximum bonus prize increase on the missions with more bombs. The object of the bonus is to select the question marks without getting a bomb. Should the player select a bomb a smaller prize will be awarded along with prizes already collected. The bonus awarded is the sum of all prizes collected.

Figure 9:
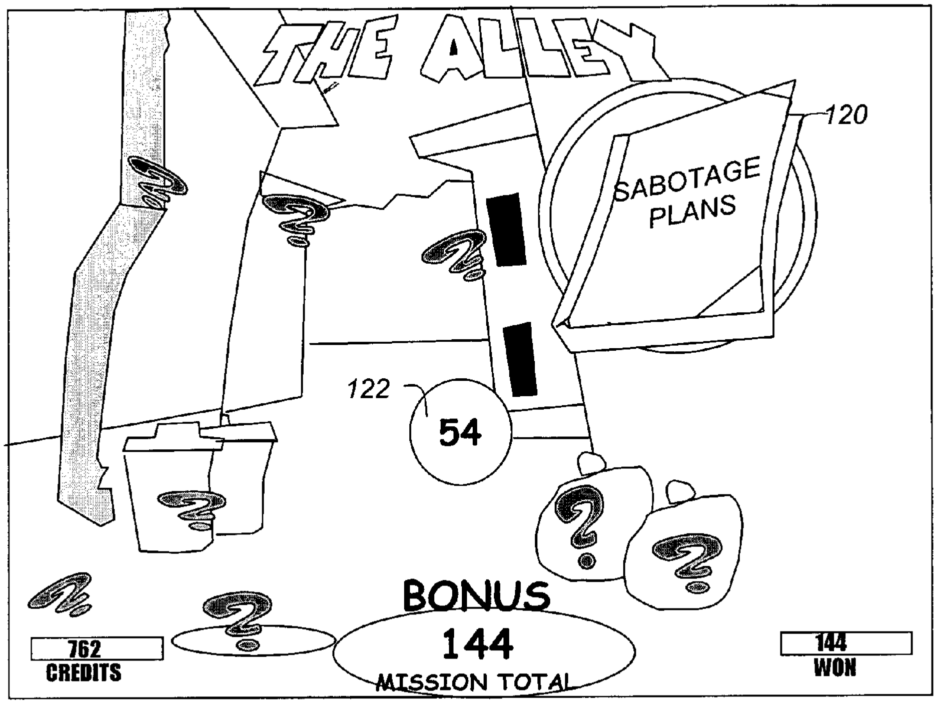
FIG. 9 illustrates a sample mission bonus round screen for a selected risk level after a couple of selections have been made on the screen.

Referring to FIG. 9 there is illustrated a sample mission bonus round screen for a selected risk level after a couple of selections have been made on the screen. Once the bonus screen is visible instructions telling the player how much they can win, how many bombs and how many prizes there are appear on the bonus screen. A “Play” button also appears. If the player does not press play after approximately 5 seconds the bonus round continues automatically The credits and total bonus windows 84 and 94 are also displayed. After the player presses “Play” a scanner graphic animates down the screen from top to bottom. Fingerprints appear while this graphic is over the areas that they lay. Once the scanner has past each fingerprint it turns into an animating question mark, as shown in FIG. 9.

Once the scanner is gone from the screen are the background image of the selected mission area and the animating question marks scattered on the screen, as shown in FIG. 9. When the player touches one of question marks, it changes to one of several icons representing a clue or a bomb, which are shown in FIG. 9. The icon scales to a larger size 120 and a prize amount is displayed. As long as a clue is selected and not a bomb, the icon then scaled down to a smaller size 122. The player keeps picking prizes until a bomb icon is picked or all the prizes have been selected.

Credits won are added to the total bonus. The bonus amount is incremented in a similar manner as the credits window in the main game.

Figure 10:
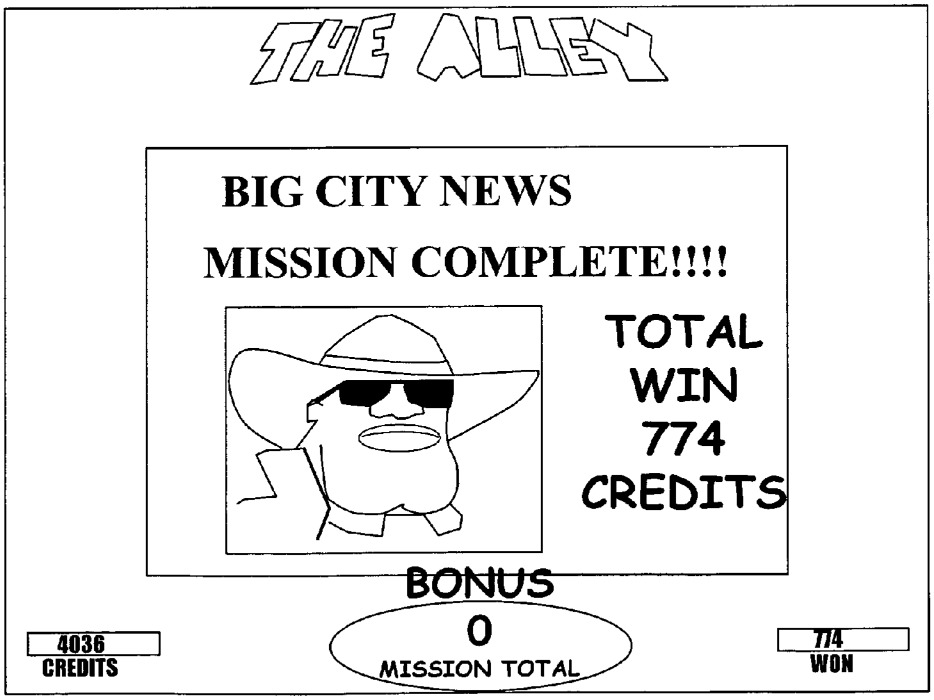
FIG. 10 illustrates a sample mission bonus round screen for a successfully completed mission bonus round.

Referring to FIG. 10 there is illustrated a sample mission bonus round screen for a successfully completed mission bonus round. If the player selects all the clues without getting a bomb, a mission complete image is displayed as shown in FIG. 10. This image contains the total credits won. The player is then returned to the main game screen of FIG. 4.

Figure 11:
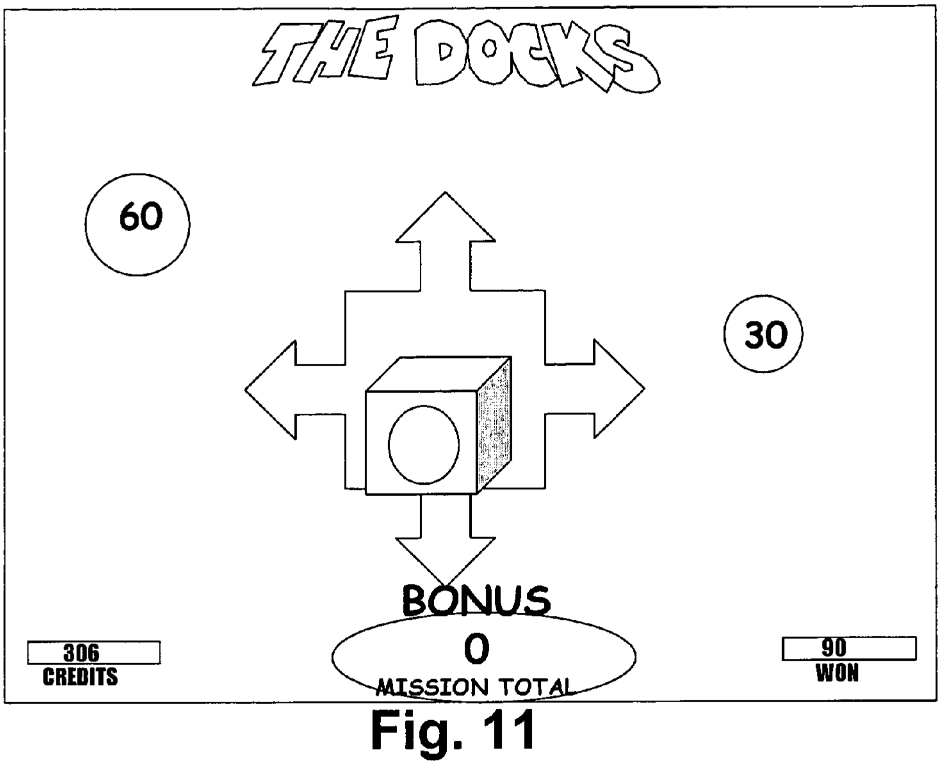
FIG. 11 illustrates a sample mission bonus round screen for another selected risk level after a bomb has been selected.

Referring to FIG. 11 there is illustrated a sample mission bonus round screen for another selected risk level after a bomb has been selected. If a bomb is picked, the bomb is scaled to a larger size, as shown in FIG. 11 and an animation of the bomb exploding is played.

Figure 12:
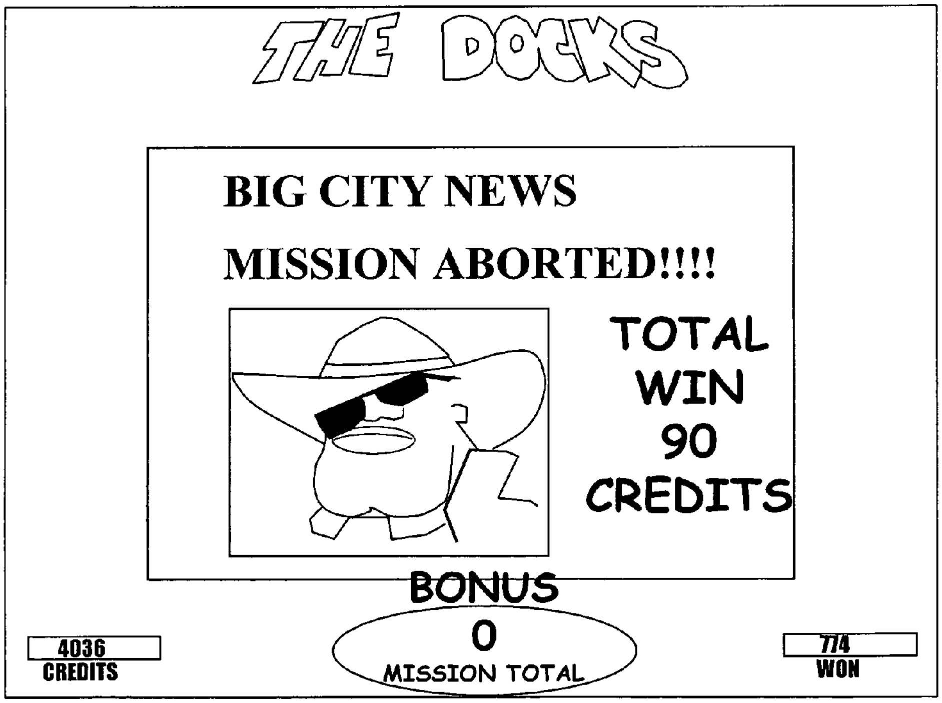
FIG. 12 illustrates a sample mission bonus round screen for an aborted mission bonus round.

Referring to FIG. 12 there is illustrated a sample mission bonus round screen for an aborted mission bonus round. After the bomb animation is played a mission aborted image is displayed as shown in FIG. 12. This image contains the total credits won. The player is then returned to the main game of FIG. 4.

Each of the mission bonus elements is hidden under a question mark and starts small and grows to a larger size when the question mark that it is under is selected. The mission bonus elements are: a suitcase, a camera, a report stamped TOP, SECRET, keys, gloves, film, sabotage plans, photos, a passport, an ID badge and a bomb.

Figure 13:
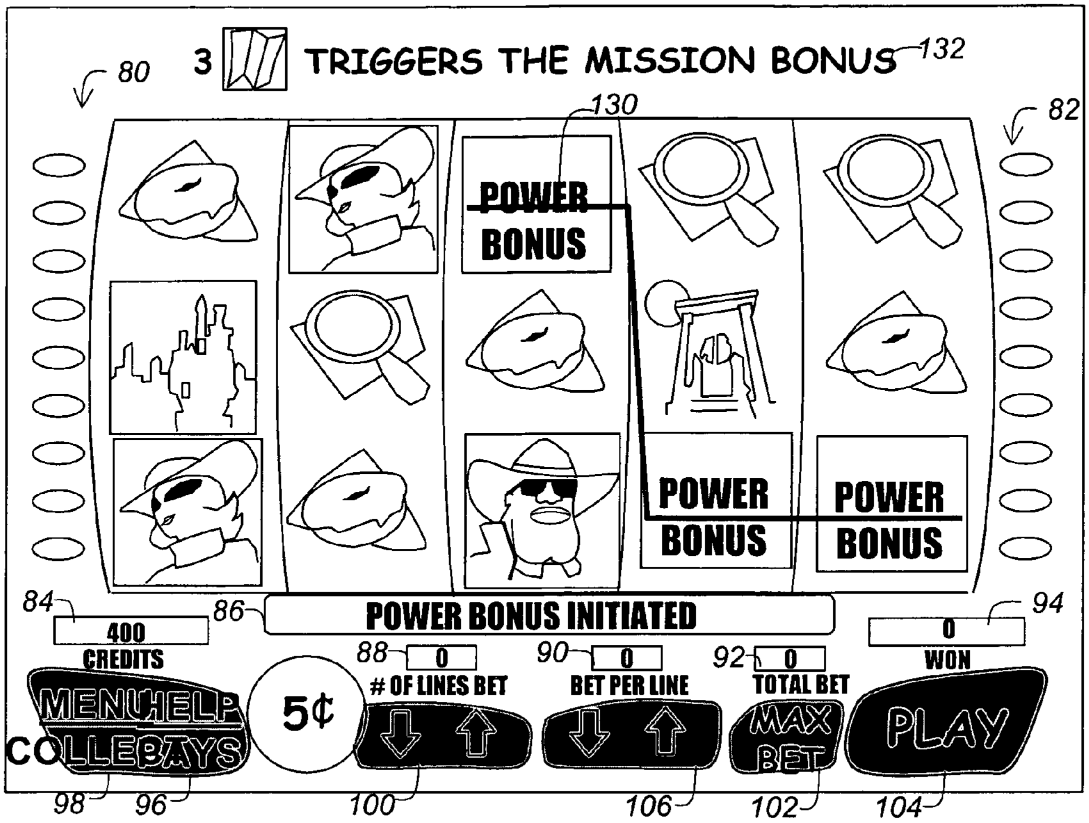
FIG. 13 illustrates on a sample game screen for the gaming machine game of FIGS. 3 and 4, how power bonus elements act trigger a power bonus round.

Referring to FIG. 13 there is illustrated on a sample game screen for the gaming machine game of FIGS. 3 and 4, how power bonus elements act trigger a power bonus round. The game of FIGS. 3 and 4 also include a power bonus round triggered as shown in FIG. 13.

The above disclosure sets forth a number of embodiments of the present invention. Other arrangements or embodiments, not precisely set forth, could be practiced under the teachings of the present invention and as set forth in the following claims.

What is claimed is:

1. A method of facilitating the play of a wagering game with a bonus feature on a video game machine having a display, comprising:

providing a bonus trigger during a regular play session on the video game machine;

after providing the bonus trigger, presenting the player with a set of choices by displaying a first bonus screen on the display of the video game machine, the first bonus screen having a plurality of objects respectively corresponding to the choices in the set of choices, the choices in the set of choices each having an associated risk level, and the set of choices corresponding to a set of virtual destinations;

providing an indication to the player of the risks of the choices on the display of the video game machine;

wherein the plurality of objects are numbered to display the associated risk level from safest to highest risk;

after providing the indication, receiving from the player a selection of one of the choices;

providing a bonus play to the player on the display of the video game machine, the bonus play having the risk level associated with the selected choice and as part of the bonus play, displaying, on the display of the video game machine, a second bonus screen having a plurality of second objects configured to be selected by the player to win bonus prizes, wherein the plurality of second objects also includes at least one collect object that ends the bonus play; wherein the quantity of collect objects in the plurality of second objects corresponds to the risk level associated with the choice selected by the player.

2. The method of claim 1 wherein the risk level associated with a choice increases with increasing numbers of the corresponding objects.

3. The method of claim 1, wherein the quantity of collect objects equals the numbered risk level.

4. The method of claim 1, wherein the bonus play includes a plurality of additional spins.

5. The method of claim 1, further comprising:

incrementing a progressive counter in dependence upon at least one of regular play and bonus play.

6. The method of claim 1, further comprising:

awarding the player an additional bonus play during the bonus play.

7. The method of claim 1, further comprising:

displaying the set of virtual destinations on a map.

8. The method of claim 1, wherein a maximum bonus prize available in the bonus play corresponds to the risk level associated with the choice selected by the player.

9. A gaming machine with bonus round, comprising:

a bonus trigger for triggering a bonus during a regular play session;

means for awarding a player a bonus play on hitting the bonus trigger during a regular play session;

means for displaying to the player a set of choices for the bonus play, each of the choices having an associated risk level and the set of choices corresponding to a set of virtual destinations;

wherein each of the choices are numbered to display the associated risk level from safest to highest risk;

means for allowing a player to select one of the choices and the associated risk level for the bonus play, said means for allowing comprising a first bonus screen having a plurality of objects for the player to select to chose a corresponding risk level; and means for providing the bonus play to the player with the selected risk level, wherein the bonus play includes a second bonus screen having a plurality of second objects for the player to select to win bonus prizes and the plurality of second objects also includes at least one collect object that ends the bonus play; wherein the quantity of collect objects in the plurality of second objects corresponds to the risk level associated with the choice selected by the player.

10. A gaming machine as claimed in claim 9 wherein the risk level increases with increasing object numbers.

11. A gaming machine as claimed in claim 9, wherein the quantity of collect objects equals the numbered risk level.

12. A gaming machine as claimed in claim 9 wherein the bonus play includes a plurality of additional bonus rounds.

13. A gaming machine as claimed in claim 9 further comprising a progressive counter for incrementing in dependence upon at least one of regular play and bonus play.

14. A gaming machine as claimed in claim 9 further comprising means for allowing a player to win an additional bonus play during the bonus play.

15. A gaming machine as claimed in claim 9 wherein the set of virtual destinations are displayed on a map.

16. The gaming machine of claim 9, wherein a maximum bonus prize available in the bonus play corresponds to the risk level associated with the choice selected by the player.

17. A non-transitory computer-readable storage medium encoded with a program configured to cause a game machine to perform a method of facilitating the play of a wagering game with a bonus feature, comprising:

providing a bonus trigger during a regular play session to a player;

after providing the bonus trigger, presenting the player with a set of choices by displaying a first bonus screen having a plurality of objects respectively corresponding to the choices in the set of choices, the choices in the set of choices each having an associated risk level, and the set of choices corresponding to a set of virtual destinations;

providing an indication to the player of the risks of the choices;

wherein the plurality of objects are numbered to display the associated risk level from safest to highest risk;

after providing the indication, receiving from the player a selection of one of the of choices;

providing a bonus play to the player, the bonus play having the risk level associated with the selected choice and as part of the bonus play, displaying a second bonus screen having a plurality of second objects configured to be selected by the player to win bonus prizes, wherein the plurality of second objects also includes at least one collect object that ends the bonus play;

wherein the quantity of collect objects in the plurality of second objects corresponds to the risk level associated with the choice selected by the player.

18. The computer-readable storage medium of claim 17, wherein the risk level associated with a choice increases with increasing numbers of the corresponding objects.

19. The computer-readable storage medium of claim 17, wherein the quantity of collect objects equals the numbered risk level.

20. The computer-readable storage medium of claim 17, wherein the bonus play includes a plurality of additional spins.

21. The computer-readable storage medium of claim 17, wherein the method further comprises:

incrementing a progressive counter in dependence upon at least one of regular play and bonus play.

22. The computer-readable storage medium of claim 17, wherein the method further comprises:

awarding the player an additional bonus play during the bonus play.

23. The method of claim 1, further comprising:

indicating to the player the relative risks associated with the choices available to the player in the bonus play.

24. The method of claim 23, wherein the bonus play includes the player picking a succession of different objects until a hidden termination object is selected.

25. The method of claim 24, wherein the risk level is determined at least in part by the number of hidden termination objects.

26. The computer-readable storage medium of claim 17, where the method further comprises:

indicating to the player the relative risks associated with the choices available to the player in the bonus play.

27. The computer-readable storage medium of claim 26, wherein the bonus play includes the player picking a succession of different objects until a hidden termination object is selected.

28. The computer-readable storage medium of claim 27, wherein the risk level is determined at least in part by the number of hidden termination objects.

29. The gaming machine of claim 9, further comprising:

means for indicating the relative risks associated with the choices available to the player in the bonus play.

30. The gaming machine of claim 29, wherein the bonus play includes the player picking a succession of different objects until a hidden termination object is selected.

31. The gaming machine of claim 30, wherein the risk level is determined at least in part by the number of hidden termination objects.

32. The computer-readable storage medium of 17, wherein the method further comprises:

displaying the set of virtual destinations on a map.

33. The computer-readable storage medium of claim 17, wherein a maximum bonus prize available in the bonus play corresponds to the risk level associated with the choice selected by the player.

34. A computer-implemented method of facilitating the play of a wagering game with a bonus feature, comprising:

providing, with a processor, a bonus trigger during a regular play session;

after providing the bonus trigger, presenting, with a processor, the player with a set of choices by displaying a first bonus screen having a plurality of objects respectively corresponding to the choices in the set of choices, the choices in the set of choices each having an associated risk level, and the set of choices corresponding to a set of virtual destinations;

providing, with a processor, an indication to the player of the risks of the choices;

wherein the plurality of objects are numbered to display the associated risk level from safest to highest risk;

after providing the indication, receiving from the player a selection of one of the choices;

providing, with a processor, a bonus play to the player, the bonus play having the risk level associated with the selected choice and as part of the bonus play, displaying, with a processor, a second bonus screen having a plurality of second objects configured to be selected by the player to win bonus prizes, wherein the plurality of second objects also includes at least one collect object that ends the bonus play;

wherein the quantity of collect objects in the plurality of second objects corresponds to the risk level associated with the choice selected by the player.

35. The method of claim 34, wherein providing the bonus play includes receiving from the player a succession of choices of different objects until a hidden termination object is selected.

36. The method of claim 35, wherein the risk level is determined at least in part by the number of hidden termination objects.

37. The method of claim 34, wherein the set of virtual destinations are displayed on a map.

38. The method of claim 34, wherein a maximum bonus prize available in the bonus play corresponds to the risk level associated with the choice selected by the player.

39. A wagering gaming system, comprising: a display;

a processor in communication with the display and configured to cause the display to display a regular play session for a wagering game, the processor further configured to cause the display to display a bonus trigger during the regular play session, the processor further configured to cause the display to display a bonus play conditioned on the display of the bonus trigger, the processor further configured, after the display of the bonus trigger, to cause the display to display a set of choices by displaying a first bonus screen having a plurality of objects respectively corresponding to the choices in the set of choices, the set of choices corresponding to a set of virtual destinations and configured to visually indicate risks of the set of choices in the bonus play; wherein the plurality of objects are numbered to display the associated risk level from safest to highest risk and an input device in communication with the processor configured to receive a player selection of one of the set of choices, the processor further configured, responsive to the receipt of the player selection, to provide the bonus play with the risk level corresponding to the player selection and configured to display a second bonus screen as part of the bonus play, said bonus screen having a plurality of second objects configured to be selected by the player to win bonus prizes, wherein the plurality of second objects also includes at least one collect object that ends the bonus play;

wherein the quantity of collect objects in the plurality of second objects corresponds to the risk level associated with the choice selected by the player.

40. The system of claim 39, wherein the processor is further configured, as part of the bonus play, to receive from the player a succession of choices of different objects until a hidden termination object is selected.

41. The system of claim 40, wherein the risk level is determined at least in part by the number of hidden termination objects.

42. The system of claim 39, wherein the set of virtual destinations are displayed on a map.

43. The wagering gaming system of claim 39, wherein a maximum bonus prize available in the bonus play corresponds to the risk level associated with the choice selected by the player.

* * * * *